(12) United States Patent  (10) Patent No.: US 8,401,142 B2
Keegan et al.  (45) Date of Patent: Mar. 19, 2013

(54) NUCLEAR REACTOR VESSEL FUEL THERMAL INSULATING BARRIER

(75) Inventors: C. Patrick Keegan, Latrobe, PA (US);
James H. Scobel, Irwin, PA (US);
Richard F. Wright, Greenock, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1127 days.

(21) Appl. No.: 11/743,844

(22) Filed: May 3, 2007

(65) Prior Publication Data

US 2008/0198960 A1  Aug. 21, 2008

Related U.S. Application Data

(60) Provisional application No. 60/890,625, filed on Feb. 20, 2007.

(51) Int. Cl.
*G21C 9/00* (2006.01)
(52) U.S. Cl. .......................... 376/289; 376/277; 376/287
(58) Field of Classification Search .................. 376/289, 376/287, 204, 205, 206, 272, 280; 250/506.1
See application file for complete search history.

(56) References Cited

U.S. PATENT DOCUMENTS

| | | | |
|---|---|---|---|
| 4,061,535 A | | 12/1977 | Nolan et al. |
| 4,071,404 A | * | 1/1978 | Aoki .............................. 376/287 |
| 4,429,329 A | * | 1/1984 | Clemens et al. ................. 348/82 |
| H0000558 H | * | 12/1988 | Coomes et al. ............... 252/478 |
| 5,268,944 A | | 12/1993 | Ekeroth et al. |
| 5,295,169 A | * | 3/1994 | Tominaga et al. ............ 376/293 |
| 5,699,394 A | * | 12/1997 | Schreiber et al. ............. 376/289 |
| 5,889,830 A | * | 3/1999 | Hollmann ...................... 376/280 |

FOREIGN PATENT DOCUMENTS

| DE | 34 23 185 A1 | | 1/1986 |
|---|---|---|---|
| DE | 3423185 A1 | * | 1/1986 |

OTHER PUBLICATIONS

Machine Translation of German Patent DE 3423185 A1.*

* cited by examiner

*Primary Examiner* — Jack W Keith
*Assistant Examiner* — Marshall O'Connor (57) ABSTRACT

The reactor vessel of a nuclear reactor installation which is suspended from the cold leg nozzles in a reactor cavity is provided with a lower thermal insulating barrier spaced from the reactor vessel that has a hemispherical lower section that increases in volume from the center line of the reactor to the outer extent of the diameter of the thermal insulating barrier and smoothly transitions up the side walls of the vessel. The space between the thermal insulating barrier and the reactor vessel forms a chamber which can be flooded with cooling water through passive valving to directly cool the reactor vessel in the event of a severe accident. The passive inlet valve for the cooling water includes a buoyant door that is normally maintained sealed under its own weight and floats open when the cavity is flooded. Passively opening steam vents are also provided.

17 Claims, 4 Drawing Sheets

NUCLEAR REACTOR VESSEL FUEL THERMAL INSULATING BARRIER

CROSS-REFERNCE TO RELATED APPLICATIONS

This application claims priority to U.S. Provisional Application Ser. No. 60/890625, filed Feb. 20, 2007.

GOVERNMENT INTEREST

This invention was made with government support under Contract No. DE-FC 07-05ID14636, awarded by the Department of Energy. The government has certain rights in this invention.

BACKGROUND OF THE INVENTION

1. Field of the Invention

This invention relates to an apparatus for providing thermal insulation around a nuclear reactor pressure vessel while at the same time permitting the reactor vessel to be surrounded passively with cooling water in the event of a severe accident in which the core material relocates.

2. Background Information

The pressure vessel of a nuclear reactor that houses the nuclear fuel must he provided with biological shielding to protect personnel and equipment in the surrounding area from the high neutron flux and radiation produced by the fission reactions within the core of the reactor. Typically, in commercial nuclear power plants, this biological shielding is provided by a massive concrete structure within a containment that defines a cavity or well in which the reactor vessel is suspended by supports under its inlet nozzles. In order to protect the concrete walls of the reactor well from high temperatures and for thermal efficiency of the process, the reactor vessel is provided with thermal insulation. Typically, the thermal insulation is applied directly to the outer surface of the reactor vessel. This requires removal of the thermal insulation for periodic external vessel inspection of the vessel welds, U.S. Pat. No. 5.268,944 suggests an arrangement in which an octagonal configuration of insulating panels is placed around the upright cylindrical reactor vessel to provide a space in which remotely operated inspection equipment can externally monitor the welds without the removal of the insulation.

In addition to the thermal insulation, it is common to circulate cooling air over the walls of the reactor cavity. This cooling air flows out of the top of the reactor cavity and then laterally through the vessel supports.

Another consideration for design of nuclear power plants is neutron streaming, which is the flow of neutrons upward out of the reactor cavity. Typically, neutron absorbing material has been provided around the reactor vessel above the inlet and outlet nozzles. However, the farther from the core that the neutron stream is intercepted, the greater the area of protection that is required.

The assignee of this invention has developed a design for a nuclear power plant that is provided with passive protection systems. The passive protection systems do not require human intervention to respond to abnormal conditions in the operation of the reactor. The safety systems provide for a passive response to a severe accident which is postulated as a meltdown or relocation of the reactor core. It has been determined that the integrity of the reactor vessel can be maintained if the vessel can be immersed in cooling water which is free to vaporize and cam off the heat as steam. One of the passive systems currently available utilizes the large volume of refueling water maintained within the containment for flooding the vessel cavity. For a severe accident in which the core of the reactor melts, it is essential that the large volume of cooling water be applied directly to the vessel.

There is a need, therefore, for an apparatus that can respond to a severe accident and passively immerse the reactor vessel directly in cooling water which is free to vaporize and disperse from the reactor cavity.

There is a further need to continue to provide air cooling for the reactor cavity walls, but without cooling the reactor vessel itself.

There is also a need for protection against neutron streaming to locations outside of the reactor cavity.

There is also a need to simultaneously accommodate all of the above needs economically and reliably without the need for human intervention.

The foregoing needs were satisfied for an AP600 nuclear plant designed by the assignee of this invention by the vessel insulation system described in U.S. Pat. No. 5,699,394. However, it was also determined that the described insulation system would not be sufficient to adequately cool an AP1000 pressure vessel (also designed by the assignee of this invention) in the unlikely event of a nuclear core relocation. Therefore, there is a need to simultaneously accommodate all of the above needs economically and reliably without the need for human intervention for an AP1000 nuclear power generating facility.

SUMMARY OF THE INVENTION

These needs, and others, are satisfied by the invention described herein which is directed to art apparatus which provides thermal insulation for the reactor vessel and air cooling of the wails of the reactor cavity during normal operation of the reactor. The apparatus also provides for direct application of cooling water to the reactor vessel and escape of the resultant steam produced during a severe accident. A thermal insulating barrier encloses, but is spaced from, the portion of the reactor vessel suspended in the reactor cavity. The area between the thermal insulating barrier and the reactor vessel forms a normally closed chamber or annul us. The thermal insulating barrier is also spaced from the walls of the vessel cavity so that the cooling air can be circulated along the walls during normal operation. During a severe accident, cooling water is introduced into the chamber formed between the reactor vessel and the thermal insulating barrier by cooling means, preferably comprising passive means, which releases the steam at the upper end of the thermal insulating barrier .formed by the vaporization of the cooling water by the hot reactor vessel. The passive means includes first valve means provided in a water inlet assembly in a lower hemispherical part of the thermal insulating barrier. This first valve means comprises one or more valve members having sufficient weight to remain seated on valve seats and block the entrance of cooling air into the chamber during normal operation, but which are buoyant and are pivoted around a hinge connected to the thermal insulating barrier upon the introduction of the cooling water into the reactor cavity in response to a severe accident. The cooling water floats the buoyant valve members off the valve seat so that the cooling water gains access to the annulus between the thermal insulating barrier and the reactor vessel. Preferably, the thermal insulating barrier includes a lower hemispherical portion that substantially matches the curvature of the bottom portion of the vessel. The lower hemispherical portion of the thermal insulating barrier has a smooth transition to sidewalls which parallel the sidewalls of the vessel. Desirably, the bottom head of the vessel and the thermal insulating barrier define an annulus that increases in volume from the axial center line of the vessel to the outside diameter of the bottom head of the vessel. Once opened, the buoyant member is designed to fail in an open position should if lose its buoyancy.

The passive means also includes a second valve means at the upper end of the upper cylindrical part of the thermal insulating barrier which is opened by steam formed in the annulus between the thermal insulating barrier and the vessel to cam away the heat from the vessel. The second valve means desirably vents the steam into the nozzle gallery, where it recirculates with the water flooding the containment. The second valve means includes a bistable valve which is operated from a. closed position to an open position by the steam pressure. Preferably, the bistable valve member is pivoted on a hinge attached to the neutron shield. The hinge pivots the bistable valve about a horizontal axis adjacent its lower end and is positioned to one side of vertical to the closed position and is operated by steam pressure to pass through the vertical to the open position where it remains until it is reset. The cooling air and the mixture of water and steam have separate exit paths from the reactor well.

BRIEF DESCRIPTION OF THE DRAWINGS

A full understanding of the invention can be gamed from the following description of the preferred embodiments when read in conjunction with the accompanying drawings in which.

DESCRIPTION OF THE PREFERRED EMBODIMENTS

Figure 1:
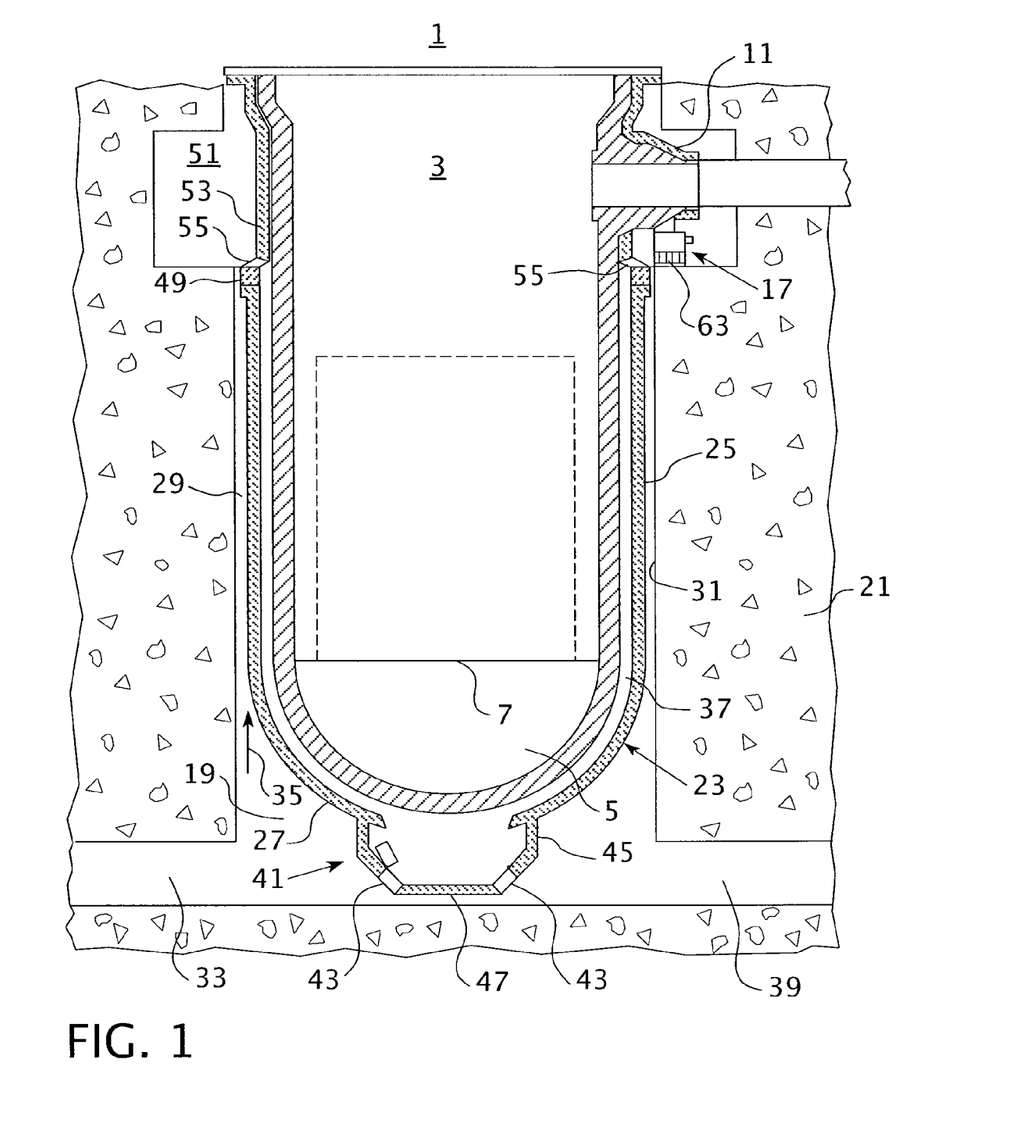
FIG. 1 is a vertical sectional view through a nuclear reactor well incorporating this invention.
Figure 2:
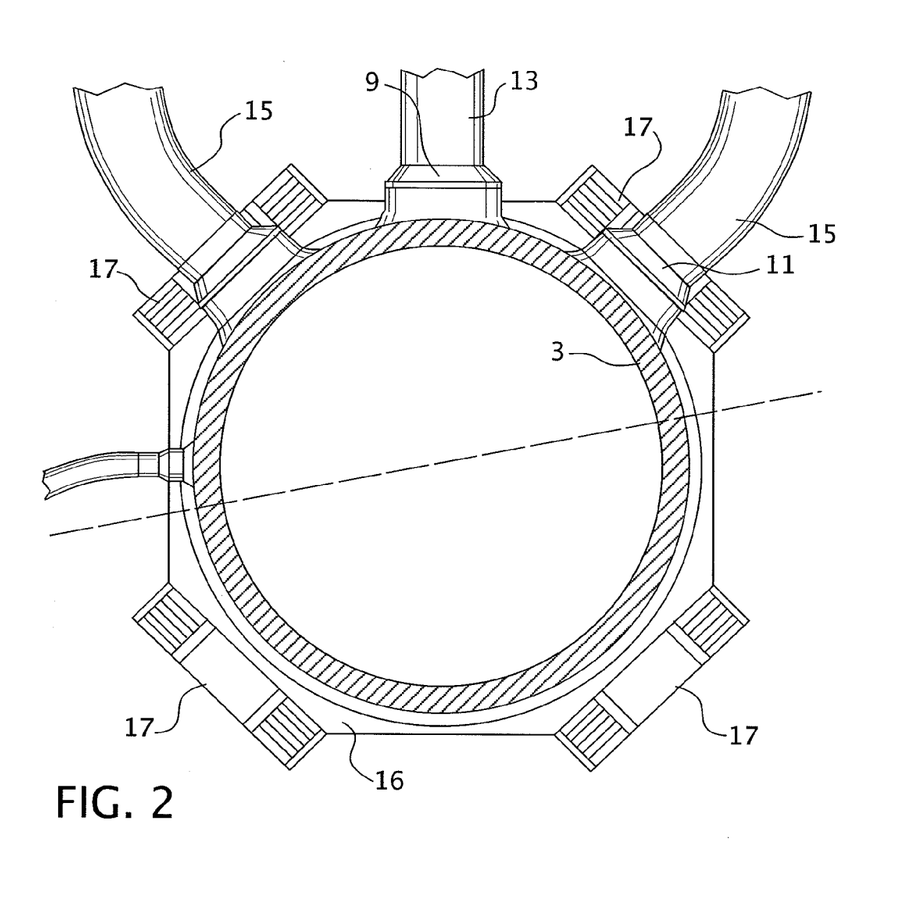
FIG. 2 shows in the upper half, above the phantom line, a plan view taken from above the nozzles of the reactor cavity shown in FIG. 1 and the lower half is a plan view taken below the nozzles.

FIG. 1 illustrates the pertinent portions of a nuclear reactor installation 1 in the form of an advanced pressurized water reactor. The reactor includes an upright cylindrical vessel 3 having a hemispherical lower end 5. The reactor vessel 3 contains a core 7 of fissionable material. As is well known, reactor fluid in the form of light water is circulated through the core. The hot coolant is discharged through hot leg nozzles 9 (shown in FIG. 2) for circulation through a steam generator (not shown) which utilizes the heat m the coolant to generate steam for a turbine generator (also not shown). The coolant is returned to the reactor vessel 3 through cold leg nozzles 11. The exemplary plant is a two-loop installation; that is, the single reactor supplies heated coolant for two steam generators. As illustrated in FIG. 2, each loop includes one hot leg 13 connected to a hot leg nozzle 9 and two cool legs 15 connected to cold leg nozzles 11. While FIG. 2 only shows the nozzle arrangement for one loop, the corresponding nozzles for the other loop are diametrically opposed.

Also, in Fig, 2, structure 16 generally represents a neutron shield 49 and components of a thermal insulating barrier 23.

The vessel 3 is supported on four supports 17 upon which the cold leg nozzles 11 rest, with the vessel suspended in a reactor cavity 19. The nozzle chamber 51, also known as the nozzle gallery, in which the vessel is supported, is square, while the reactor cavity 19 is octagonal in plat) view. The reactor cavity 19 is defined by a massive concrete structure 21 which forms a biological shield which protects personnel as well as adjacent structures and equipment, from the high neutron flux and radiation generated within the core 7 of the reactor.

A reactor vessel 3 is provided with a lower thermal insulating barrier 23 which has a generally cylindrical upper part 25 and an approximately hemispherical lower part 27 with a relatively smooth transition therebetween. The thermal barrier 23 is spaced from the reactor vessel 3 to form a chamber or annulus 37. A thermal barrier 23 insulates the reactor vessel 3 for thermal efficiency, and also protects the concrete walls 31 of the reactor cavity or well 19 from the high temperature of the reactor vessel's outer surface. In addition, cooling air introduced at the bottom of the reactor cavity 19 through tunnel 33 flows upward, as shown by the arrow 35 along the walls 31 through the space 29 between the walls and the thermal insulating barrier 23. The discharge path for the air will be discussed in more detail below.

In the event of a loss of coolant accident (LOCA), cooling water is introduced into the reactor cavity 19 through a cooling water tunnel 39. In the case of a severe accident wherein the core 7 melts and settles to the hemispherical lower end 5 of the reactor vessel, it is essential that cooling water come into direct contact with the reactor vessel 3. On the other hand, under non-accident conditions, the cooling air should only flow along the cavity walls 31 and should not contact the reactor vessel 3. Therefore, passive valving 41 is provided to block the entrance of air into the chamber 37, but allows introduction of the cooling water. The high temperature of the reactor vessel causes the cooling water to vaporize, and hence the passive valving must also provide for escape of the steam. Thus, the passive valving 41 includes a first, core inlet valve 43 mounted in a water inlet assembly 45 at the lower end of the hemispherical portion 2 of the thermal insulating barrier 23. Cooling water reaches the inlet valve 43 in the water inlet assembly 45 which helps support the hemispherical portion 27 of the thermal insulating barrier 23. Thermal insulation 47 and an air space are provided to protect the concrete floor of the vessel cavity 19 from the high temperature of the reactor vessel.

The side wails 25 of the thermal insulating barrier 23 provides an annulus with the reactor vessel 3 up to a neutron shield 49 which surrounds the vessel 3 just below the elevation of the nozzle gallery 51 on which the inlet nozzles 11 are supported. As previously mentioned, the neutron shield 49 is made of a neutron-absorbing material that limits neutrons escaping from the core 7 from streaming out of the reactor cavity 19. The thermal insulation barrier interfaces with the bottom of the neutron shield 49, as cat be appreciated from FIGS. 4 and 5. The neutron shield 49 extends the annulus 37 with the reactor vessel and is insulated as required to maintain an acceptable temperature for the shielding material. The radially outboard surface of the neutron shield 49 provides a gap with the reactor cavity wall 31. so that cooling air flowing on the outside of the thermal .insulation barrier during normal conditions flows along this surface, cooling the wall concrete in this region. A seal 67 closes the gap between the neutron shield 49 and the floor of the nozzle gallery 51, except at the reactor vessel supports 17. A duct 63 which extends through the reactor nozzle support 17 extends between the seals connecting the gallery floor opening with the reactor vessel support. The cooling air flowing in the space between the neutron shield 49 and the reactor cavity wall 31 flows into these ducts 63 and then is ducted into the reactor vessel support 17. Above the neutron shield 49 and in the nozzle gallery 51, are steam vents 55 around the circumference of the reactor vessel 3. Above these steam vents, the annulus ends and the thermal insulation barrier 53 is closer to the reactor vessel 3. The steam vents 55 extend from the neutron shield 49 to the upper insulation insulating the reactor vessel in this region during normal operations. The steam vent assemblies 55 have hinged doors 56 that are normally closed but open to vent steam during a severe accident, as will be discussed below. Neutron shielding is also added on the ceiling of the nozzle gallery 51 to achieve radiation levels well below acceptable limits on the operating deck.

Figure 3:
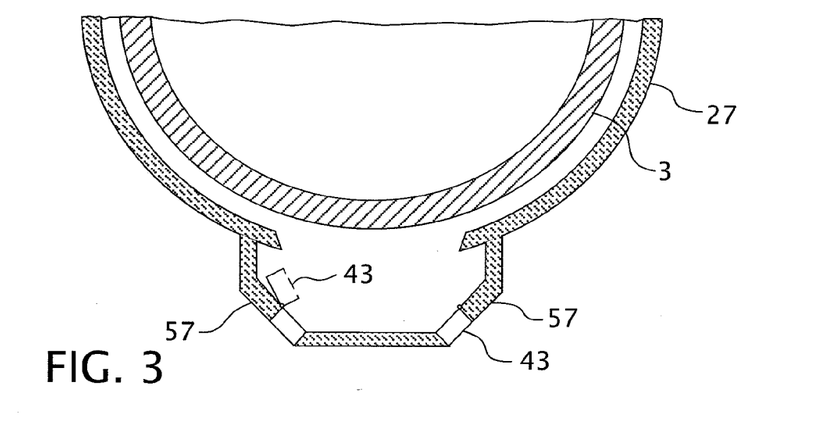
FIG. 3 is a cross-sectional view of the lower portion of FIG. 1 illustrating the valve which allows cooling water to enter the chamber between the thermal insulating barrier and the reactor vessel.

The insulation on the bottom head 27 of the thermal insulation barrier 23 has an opening at the vessel 3 axial center line. Below tins opening is the inlet assembly 45 which can best be viewed from FIG. 3. The inlet assembly 45 has inwardly-sloping sides 57 containing four relatively large hinged doors 43 filled with buoyant hydrophobic material. Gravity holds the doors 43 closed during normal conditions, but floodwater in the reactor cavity 19 causes the doors 43 to open.

During a severe accident, water flows into the reactor cavity 19. The inlet assembly doors 43 open, water then flows into the inlet assembly and through the opening in the bottom of the thermal insulation barrier 23 and into the annulus around the reactor vessel bottom head 5. The resulting steam-water mixture cools the outside of the vessel as it rises in the annulus. When the steam-water mixture rises to the steam vents 55, the momentum and pressure causes the doors, which can best be seen in FIGS. 4 and 5, to open and allow the steam-water mixture to exit the annulus between the thermal insulation barrier 23 and the vessel 3 and ultimately return to the containment flood water for recirculation.

U.S. Pat. No. 5,699,394 provides a conical-shaped bottom head insulation. In this improved design, the bottom head insulation 27 is curved to generally conform to the bottom head of the reactor vessel 3, but provides an increasing annulus, i.e., increasing in volume, from the axial center line of the reactor vessel 3 to the outside diameter of the reactor vessel lower head. Testing has shown that this design provides superior cooling capability and is sufficient for in-vessel core retention in the AP1000 reactor vessel.

The preferred embodiment of the referenced patent uses many small spheres filled with buoyant material in its inlet assembly. The spheres cover holes in a horizontal plate and rise into cages as the floodwater rises. More than 60 spheres are required for AP600. The AP1000 requires .more, and the spheres are so close to the floor of the reactor cavity as to be virtually uninspectable without disassembling the inlet assembly 45. in addition, the number of spheres makes it extremely time-consuming to inspect and reset them.

In this preferred embodiment, the inlet assembly has four doors 43. The doors also provide significantly reduced impedance to flow and a. reduced flow velocity for improved natural circulation. If the doors 43 ever lose their buoyancy during a severe accident., the doors will fail away from the flow stream into the open position. The spheres always remain in the flow stream, so losing their buoyancy can further impede the free flow of cooling water into the inlet assembly. Lastly, the doors 43 are easily accessed for personnel to inspect them during reactor shutdown.

This improved design has a smooth-transition from the bottom head annulus to the side wall annulus on the reactor vessel. Testing has shown that a smooth transition provides superior heat removal capabilities. Additionally, the cited patent has the steam vents below the neutron shield. Inspection requires the removal of a circumferential seal 67 between the neutron shield and the nozzle gallery floor, the removal of four cooling air ducts between the insulation and the reactor vessel supports, and the removal of the neutron shield. The steam vents described in the patent are located some distance down in the space between the reactor vessel and the reactor cavity walls and are, therefore, difficult to reach or inspect.

The improved design of this invention has the steam vents 55 above the neutron shield 49 in the nozzle gallery 51. No equipment disassembly is required to inspect steam vent operation. The steam vents 55 are directly accessible by personnel at floor level in the nozzle gallery 51.

In the design described in the patent, the steam path during a severe accident above the steam vents is the cooling air path during normal operations. Sharing this path results in a reduced steam-water flow path in this region. In addition, this results in a significantly reduced flow path where the steam-water mixture exits the annulus around the neutron shield and enters the duct between the insulation and the reactor vessel support.

The improved design of this invention provides separate flow paths around the neutron shield for the cooling air during normal operations and the steam-water mixture during a severe accident. This permits the .improved design to provide significantly greater flow area during a severe accident, resulting in less flow resistance and improved heat removal capability.

Accordingly, the reactor vessel insulation system of this invention and the reactor cavity cooling air limit the temperatures of structures and components in the reactor cavity to within allowable limits during plant design conditions. The structures and components of concern are the concrete surrounding the vessel well, the neutron shielding, and the ex-vessel neutron flux monitors, also called "ex-core detectors." Furthermore, the reactor vessel insulation system of this invention plays an important role in the unlikely event of a severe accident, when the core is relocated to the bottom head of the reactor vessel. Testing and analysis have shown that the reactor vessel can retain a molten core in the bottom head of the reactor vessel if the external surface of the vessel is cooled sufficiently. Cooling is sufficient if;
- an annulus with certain dimensions and characteristics is maintained between the reactor vessel and the reactor vessel insulation along the bottom head and up the side wall of the reactor vessel;
- water can freely and continuously flow into the annulus at the center of the reactor vessel bottom head;
- steam and water can freely vent at the top of the annulus.

The term "annulus" refers to the space between the reactor vessel and the reactor vessel insulation system, previously referred to as the thermal insulation barrier, which provides the flow path for water and steam during a severe accident.

The reactor vessel insulation system of this invention provides the outside wall of the annulus required by the first bullet above. It must, therefore, remain intact under the loadings that occur during an accident. The second and third bullets are inconsistent with the operational requirements during normal conditions when it is important to inhibit airflow into and out of the annulus to minimize heat loss from the reactor vessel, minimize the heat load on the containment cooling system, and maintain components and structures within their allowable temperatures. Unique features had to be designed to accommodate the heat removal requirements for an AP1000 plant that inhibits air exchange during normal operation but permits the bottom and top of the annulus to passively open during a severe accident. A water inlet assembly and steam vents were designed to provide these diverse features.

In the unlikely event of an in-vessel retention scenario, the following will occur. During a severe accident containment floodwater runs into the cavity. As the floodwater level rises in the reactor cavity, the buoyant doors 43 in the inlet assembly open, allowing water to enter the inlet bottom head 27 of the reactor vessel thermal insulation barrier 23. As the floodwater in the reactor cavity continues to rise, the water in the annulus 37 is converted to steam. The steam rises in the annulus, pushing water ahead of it. The rising steam-water mixture opens the steam vents 55 at the top of the annulus and flows out into the nozzle gallery 51. This steam-water mixture then returns to the containment floodwater.

The water in the reactor cavity imposes a pressure of 12.95 feet (3.95 meters) of water on the outside of the thermal insulation barrier 23, due to the steam void fraction inside. Because the steam-water mixture rises with a slugging, pumping action, and due to the formation and collapse of steam hubbies in this mixture, the pressure inside the annulus oscillates +/−1.64 feet (0.5 meters) of water. These pressures were quantified by testing and analysis and are loads that the reactor vessel insulation system of this invention has been designed to withstand.

The reactor vessel insulation system is primarily constructed of ASTM type 304 stainless steel metal reflective insulation (MRI) 4.5 inches (11.43 cm) thick. MRI generally consists of inside and outside sheet metal enclosures and multiple layers of metal foils inside. MRI insulates by minimizing internal conduction paths between the inside and outside enclosures, minimizing internal convection currents, and minimizing internal heat transfer due to radiation. MRI is used extensively in nuclear applications and is sometimes referred to as Reflective Metal Insulation (RMI).

The reactor vessel insulation system of this invention above the floor of the nozzle gallery 51 is similar in design to MRI systems used on other pressurized water reactor vessels. The MRI is manufactured in panels which can be handled by one or two workers. The MRI panels are attached together and allow a slight standoff from the reactor vessel to allow for manufacturing tolerances and reactor vessel expansion due to the temperature and pressure increases The MRI on each nozzle is a clamshell design. The clamshell design allows the MRI to be removed, for example, for in-service inspection. The clamshell sections fasten together along a longitudinal seam and to the MRI on the side wall of the reactor vessel. The MRI clamshells are supported by the MRI panels on the reactor vessel side wall and by the nozzle.

The reactor vessel insulation system below the floor of a nozzle gallery 51 provides the annulus for in vessel retention cooling. The reactor vessel insulation system must, therefore, be designed to withstand higher loads. Examples of these higher loads include the large and varying differential pressure discussed above during a severe accident and differential pressure due to containment pressurization. such as from a hypothetical pipe break in the containment. To achieve the needed strength, the MRI panels are attached to a supporting structure which is supported by the reactor cavity wall 31. In addition, the MRI panels in this region have thicker inside and outside enclosures, as well as additional stiffeners inside.

The structure that supports the bottom head 27 of the insulation attaches to the reactor cavity side wail and to legs that extend downward and attach to the reactor cavity floor (not shown). The MRI panels provide a hemispherical shape generally conforming to the shape of the bottom head of the reactor vessel 3 and providing the annulus which forms the water and steam cooling-fluid flow path that cools the outside of the reactor vessel 3. As previously mentioned, the inlet assembly 45 extends downward from the MRI on the bottom head 27 of the thermal insulation barrier 23 to the reactor cavity floor, attaching to each. The inlet assembly 45 is constructed of MRI and includes four sides and a bottom. Each side has a vertical section at the top and an inwardly sloping side below it, similar to a hopper. Alternatively, for ease of manufacture, there is a cylindrical section between the bottom head insulation and the inwardly sloping sides. A space is maintained under the bottom to assure acceptable concrete temperatures are maintained in this area. Each of the four sloping sides of the inlet assembly 45 contains a door 43. The door is hinged on the top inside edge and four open doors provide more than 6 ft$^2$ (0.56m$^2$) of flow area for water to enter the inlet assembly. The weight of the door 43 keeps it in the closed position, pressed against a continuous circumferential stop which inhibits the free exchange of air between the inside and outside of the inlet assembly 45. The doors 43 are each a hollow stainless steel enclosure filled with a buoyant hydrophobic material. The buoyant material causes the doors to rise as the reactor cavity floods with water. There is sufficient room inside the inlet assembly for the doors 43 not to contact each other during opening. Fully open, the doors are in a vertical position with their center of gravity over the hinge. In this position, the water flowing past the doors will tend to push the doors further open. If the doors ever lose their buoyancy during the severe accident, gravity and the water flow work together to cause the doors to fall outward instead of inward. The inlet assembly has sufficient space for the doors to fall outward beyond the vertical position. Small vent holes in the surface of the doors prevent pressure differentials inside the doors during reactor heat-up and cool-down. The doors have sufficient strength to contain the buoyant hydrophobic material during all events and the vent holes are small to minimize contact between the contained material and the floodwater. These features and the proper choice of buoyant hydrophobic material minimize the potential for release of materials or chemicals that could impact flow through sump screens that would affect water circulation, or the core. One example of an acceptable material is molded perlite insulation.

Door freedom can be periodically checked by pushing the inlet doors 43 inward and checking their swing action. Each door 43 is mounted in a frame, and the door and frame assembly is removable as a unit. Removing and replacing the door and frame assembly as a unit eliminates fit-up concerns if the door only were to be replaced. Replacement is not anticipated over the design life of the plant; however, it can be easily performed if needed.

Figure 4:
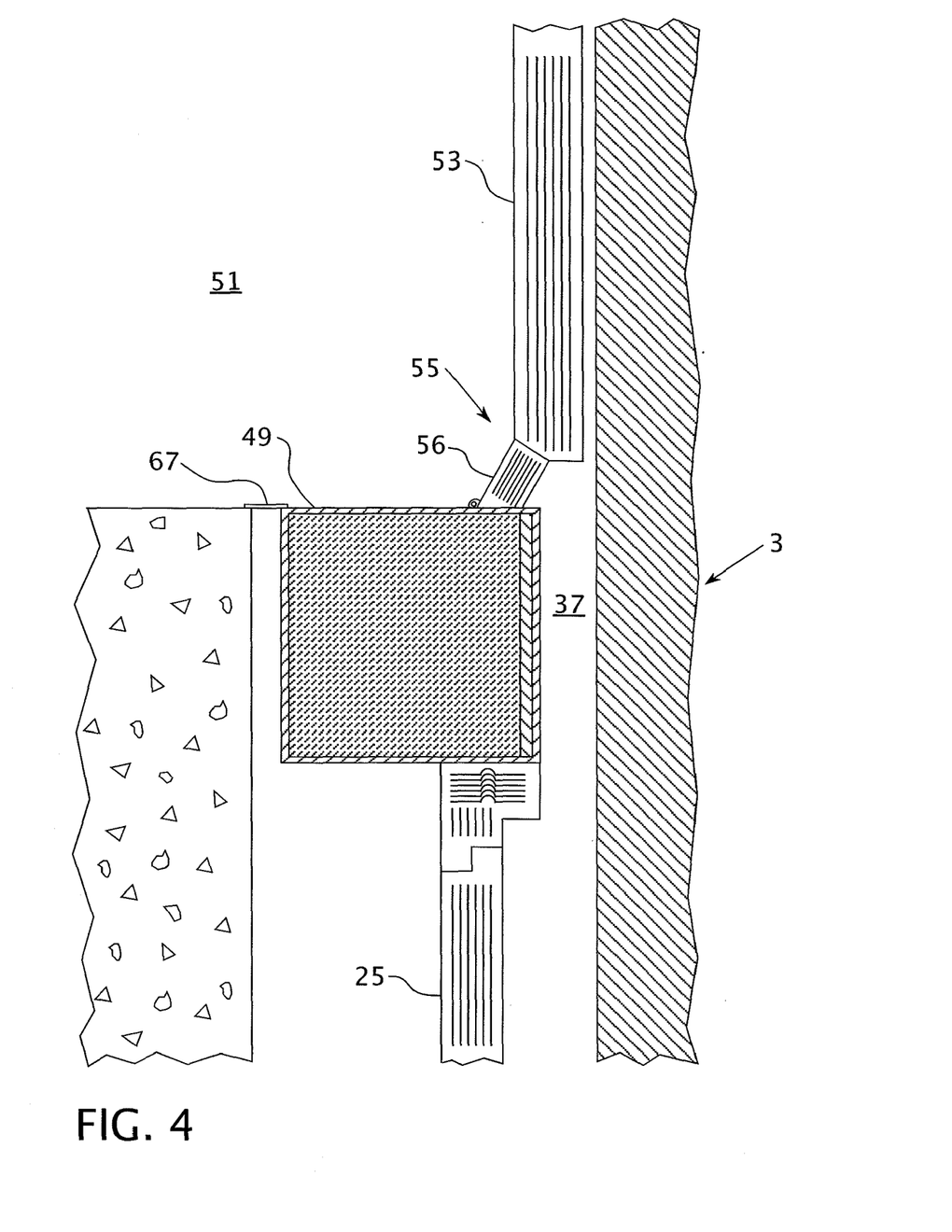
FIG. 4 is a fractional view in enlarged scale of an upper portion of FIG. I at the nozzle gallery elevation showing the steam vent doors of this invention.
Figure 5:
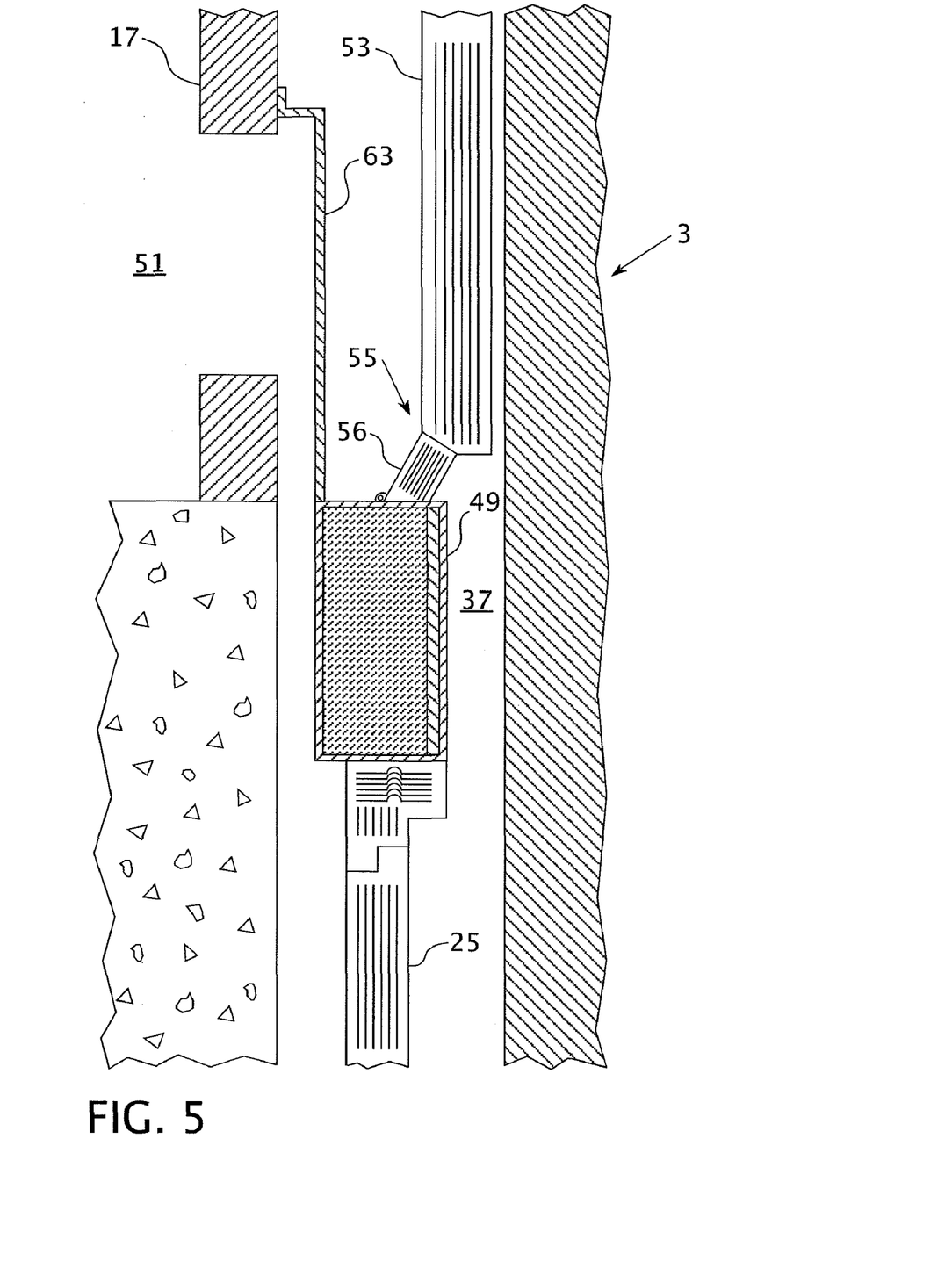
FIG. 5 is a fractional view of the reactor cavity illustrated in FIG. 1, illustrating the cooling air and steam vent paths at a nozzle support location.

As shown in FIGS. 4 and 5, at the top of the annulus 37, at the floor of the nozzle gallery 51 are steam vent assemblies 55. The steam vent assemblies 55 are comprised of a series of narrow straight doors 56 with associated hinges in the nozzle gallery 51. that extend continuously around the reactor vessel 3 from the neutron shield 49 to the upper reactor vessel insulation system panels 53. The steam vents 55 fit under each of the reactor vessel nozzles and their open doors provide a total flow area of at least 12 ft$^2$ (1.11m$^2$) for the AP1000 preferred embodiment. The steam vent doors 56 are constructed of MRI panels. The doors 56 are hinged on their outside bottom edge and slope inwardly toward the reactor vessel 3. Their top edge continuously contacts the reactor vessel insulation system panels in the nozzle gallery 51 and their sides have flow barriers to inhibit air flow between the annulus and the nozzle gallery 51. The momentum of the steam-water mixture rising in the annulus 37 opens the doors during a severe accident. Once open, the doors stay open due to gravity. If necessary, these doors could be filled with a buoyant hydrophobic material like the inlet assembly doors 43 to provide an increased force for opening once the floodwater level reaches this point, as an option. In this design, the doors have the option of being hinged at the top outside corner and the hinges attached to the upper vessel insulation 53. Like other MRI panels, the doors 56 themselves are vented to prevent internal/external pressure differentials during heat-up and cool-down.

The steam vent doors 56 are accessible during routine periodic plant shut downs. Door freedom can be checked by swinging them outward to check their swing action. In addition, the steam vent assemblies 55 are removable. Removal of the steam vent assemblies is not anticipated to be required over the design life of the plant; however, it can be performed in the unlikely event it is desired, As shown it) FIGS. 4 and 5, between the steam vents 55 and the insulation 25 is the neutron shield 49. The neutron shield 49 forms part of the flow path for both the cooling air 35 flowing upward from the reactor cavity during normal conditions and the steam-water mixture flowing upward to the steam vents 55 during a severe accident. The neutron shielding material is enclosed in a stainless steel enclosure. The neutron shield is insulated and cooled to maintain the shielding material to less than its maximum allowable temperature, e.g., 400° F. (204.44° C.) for borated silicone. Cooling air flows upward over the thermal insulation barrier 25 and then flows over the underside and outboard surface of the neutron shield 49 which also protects the concrete walls 31.

As shown in FIG. 5, removable ducts 63 mounted between the neutron shield 49 and the reactor vessel support 17 channel the reactor cavity cooling air to each reactor vessel support. Each reactor vessel support 17 has an opening that allows the cooling air to pass through and baffles to make cooling more efficient. These features maintain the concrete temperature under each support below the limit. In the preferred embodiment, in an application to an AP1000 plant, the annulus between the bottom head of the reactor vessel 3 and the bottom head insulation 27 is nominally 3 inches (7.62 cm) at the water entry point into the annulus near the radial center line of the reactor vessel 3 and then uniformly increases in width to approximately 6 inches (15.24 cm) at the outer diameter of the bottom head. The annulus then needs to smoothly transition to a 6 inch width that then extends up the side wall of the reactor vessel 3. Near the top of the annulus, the reactor vessel insulation system provides a minimum flow area of approximately 12 ft$^2$ (1.11 m$^2$) for the steam-water mixture.

While specific embodiments of the invention have been described in detail, it will be appreciated by those skilled in the art that various modifications arid alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof

What is claimed is:

1. Apparatus for thermally insulating a vessel during normal operating conditions and cooling the vessel in the event that an accident condition has a potential for raising the vessel temperature above a predefined limit, comprising:
    a vessel having a bottom head and a sidewall extending upwardly therefrom;
    thermal insulation surrounding the vessel and spaced from the bottom head and the sidewall; and
    at least one inlet door hingedly attached to the thermal insulation, the inlet door being sealed by gravity against a stop on the thermal insulation during normal operation to close an inlet to a space between the vessel and the thermal insulation and floatable with a given buoyancy when immersed in a liquid fluid to move to an open position to permit the liquid fluid to gain access to the space between the vessel and the thermal insulation under predetermined abnormal operating conditions to cool the vessel without the inlet door providing an obstruction to flow of the fluid in the open position.

2. The apparatus of claim 1 wherein the vessel has an axial centerline and the bottom head has an outside diameter and wherein the vessel bottom head and the thermal insulation define an annulus that increases in volume from the axial centerline to the outside diameter of the bottom head.

3. The apparatus of claim 1 wherein the inlet door is designed so that when the fluid enters the space between the thermal insulation and the vessel the inlet door will fail in an open position if it loses its buoyancy.

4. The apparatus of claim 1 wherein the vessel is a nuclear reactor pressure vessel that is supported in a reactor cavity suspended above a floor of the reactor cavity, the reactor cavity having upwardly extending side walls surrounding at least a lower portion of the vessel and spaced from the vessel, the thermal insulation being interposed between the side wall of the reactor cavity and the vessel and spaced from the side wall of the reactor cavity to define a cooling air path therebetween and the space between the vessel and the thermal insulation defining a liquid fluid flow path therebetween.

5. The apparatus of claim 4 wherein the fluid flow path and the cooling air path have separate exits from the reactor cavity.

6. The apparatus of claim 4 further including:
    a neutron shield for shielding at least some of a stream of neutrons from exiting the reactor cavity, the neutron shield surrounding and spaced from the vessel and spaced from the side wall of the reactor cavity so that the fluid flow path and the cooling air path respectively pass by the inner and outer surface of the neutron shield; and
    a fluid exit door hingedly attached above the neutron shield, the fluid exit door having a closed position and an open position, the closed position sealing the fluid flow path from an exit flow path from the reactor cavity and the open position providing the fluid flow path access to the exit flow path from the reactor cavity without forming an obstruction to air flow in the cooling air path.

7. The apparatus of claim 6 wherein the fluid exit door when open to permit the fluid cooling the vessel to exit remains in the open position until reset.

8. The apparatus of claim 6 wherein the vessel has nozzles disposed within a nozzle gallery that surrounds the vessel at a nozzle elevation wherein the fluid exit door permits the fluid to exit to the nozzle gallery.

9. The apparatus of claim 1 wherein the inlet door has vent holes to prevent pressure differentials between the interior and the outside of the door during vessel heat-up and cool-down.

10. The apparatus of claim 1 wherein the door is a metal shell filled with a hydrophobic material.

11. The apparatus of claim 4 further including:
    a neutron shield for shielding at least some of a stream of neutrons from exiting the reactor cavity, the neutron shield surrounding and spaced from the vessel to provide an opening for the fluid flow path;

a second set of insulation surrounding an upper portion of the vessel above the fluid flow path and the neutron shield; and a fluid exit door hingedly attached to the second set of insulation at an upper end of the exit door, the fluid exit door sealing an exit to the fluid flow path when in a closed position.

12. The apparatus of claim 11 wherein the fluid exit door is a metal enclosure filled with a buoyant hydrophobic material.

13. The apparatus of claim 8 including a plurality of fluid exit doors hingedly attached to the neutron shield at a plurality of circumferential locations both at and between positions of the nozzles.

14. The apparatus of claim 13 wherein the fluid flow path and the cooling air path have separate exits from an upper portion of the reactor cavity and the cooling air path only exits the upper portion of the reactor cavity approximately at the nozzle positions.

15. The apparatus of claim 14 wherein the fluid flow path exits the reactor cavity approximately at and between the nozzle positions.

16. The apparatus of claim 13 wherein the plurality of fluid exit doors extend substantially continuously, circumferentially around the vessel.

17. The apparatus of claim 1 wherein the thermal insulation surrounding a lower portion of the vessel, has a rounded transition extending from below the bottom head to around the sidewall of the vessel, substantially following a contour of the vessel.

* * * * *